(12) United States Patent
Mueller et al.

(10) Patent No.: US 12,515,537 B2
(45) Date of Patent: Jan. 6, 2026

(54) METHOD FOR OPTIMIZING THE POWER OF AN ELECTRIFIED VEHICLE, AND VEHICLE

(71) Applicant: Volkswagen Aktiengesellschaft, Wolfsburg (DE)

(72) Inventors: Thomas Mueller, Kassel (DE); Lennart Matthias, Tarmstedt (DE); Stefan Klie, Cremlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 557 days.

(21) Appl. No.: 17/914,046

(22) PCT Filed: Feb. 17, 2021

(86) PCT No.: PCT/EP2021/053881
§ 371 (c)(1),
(2) Date: Mar. 13, 2023

(87) PCT Pub. No.: WO2021/190824
PCT Pub. Date: Sep. 30, 2021

(65) Prior Publication Data
US 2023/0202310 A1 Jun. 29, 2023

(30) Foreign Application Priority Data
Mar. 23, 2020 (DE) .................... 10 2020 203 692.6

(51) Int. Cl.
*B60L 15/20* (2006.01)
*B60L 50/60* (2019.01)
*B60L 58/14* (2019.01)
*B60L 58/25* (2019.01)
*B60L 58/27* (2019.01)

(52) U.S. Cl.
CPC .......... *B60L 15/2045* (2013.01); *B60L 50/60* (2019.02); *B60L 58/14* (2019.02); *B60L 58/25* (2019.02);
(Continued)

(58) Field of Classification Search
CPC ...... B60L 15/2045; B60L 50/70; B60L 50/62; B60L 50/61; B60L 50/60; B60L 50/50;
(Continued)

(56) References Cited

U.S. PATENT DOCUMENTS

| | | | |
|---|---|---|---|
| 7,928,603 B2 * | 4/2011 | Ichikawa | ............ H02M 3/1582 307/45 |
| 8,159,188 B2 * | 4/2012 | Anderson | ............ H01M 10/44 320/132 |

(Continued)

FOREIGN PATENT DOCUMENTS

| | | | | |
|---|---|---|---|---|
| CA | 2882057 C | * | 8/2018 | ............ B64C 13/00 |
| CN | 102897171 A | | 1/2013 | |

(Continued)

OTHER PUBLICATIONS

Office Action for Chinese Patent Application No. 202180034351.2 mailed on Jan. 3, 2025.

*Primary Examiner* — Erin M Piateski
*Assistant Examiner* — Ashley Tiffany Schoech
(74) *Attorney, Agent, or Firm* — Muncy, Geissler, Olds & Lowe, P.C.

(57) ABSTRACT

A method for optimising the power of an electrified vehicle having at least one electrical energy accumulator, at least one electrical drive and at least one auxiliary unit, the electrical energy accumulator having a maximum discharge power and a continuous discharge power. The power available from the electrical energy accumulator is distributed intelligently in order to make vehicle operation which is acceptable to the driver of the electrified vehicle possible.

12 Claims, 3 Drawing Sheets

(52) U.S. Cl.
CPC ......... *B60L 58/27* (2019.02); *B60L 2240/545* (2013.01); *B60L 2240/547* (2013.01)

(58) Field of Classification Search
CPC .......... B60L 50/00; B60L 58/14; B60L 58/12; B60L 58/25; B60L 58/24; B60L 58/27; B60L 1140/545; B60L 1140/547; B60L 1140/549; B60L 1140/54; B60L 2250/16; B60L 2250/26; B60L 2260/162; B60L 2260/16; B60L 1/00; Y02T 10/62; Y02T 10/64; Y02T 10/672
See application file for complete search history.

(56) References Cited

U.S. PATENT DOCUMENTS

| | | | | |
|---|---|---|---|---|
| 9,352,635 | B1 * | 5/2016 | Schepmann | ....... B60H 1/00392 |
| 2012/0041621 | A1 | 2/2012 | Marus et al. | |
| 2015/0104680 | A1 * | 4/2015 | Wang | ...................... B60L 50/66 429/50 |
| 2017/0093316 | A1 | 3/2017 | Toyora | |

FOREIGN PATENT DOCUMENTS

| | | | | | |
|---|---|---|---|---|---|
| CN | 105974325 | A | | 9/2016 | |
| CN | 106864280 | A | | 6/2017 | |
| CN | 109284563 | A | * | 1/2019 | ............ G06F 30/20 |
| CN | 110077278 | A | * | 8/2019 | ................ B60L 1/00 |
| DE | 196 17 548 | A1 | | 11/1997 | |
| DE | 10326218 | A1 | * | 12/2004 | ................ B60L 3/06 |
| DE | 102011080326 | A1 | | 2/2012 | |
| DE | 102012007988 | A1 | * | 10/2013 | .......... B60L 11/1805 |
| DE | 102018116903 | A1 | * | 4/2019 | ................ B60L 1/00 |
| DE | 102018209446 | A1 | | 12/2019 | |
| ES | 2703060 | T3 | * | 3/2019 | ............. B60K 35/00 |
| JP | 2012090416 | A | * | 5/2012 | |
| JP | 2013-68590 | A | | 4/2013 | |
| WO | WO 2012085615 | A1 | | 6/2012 | |
| WO | WO 2016056069 | A1 | | 4/2016 | |

* cited by examiner

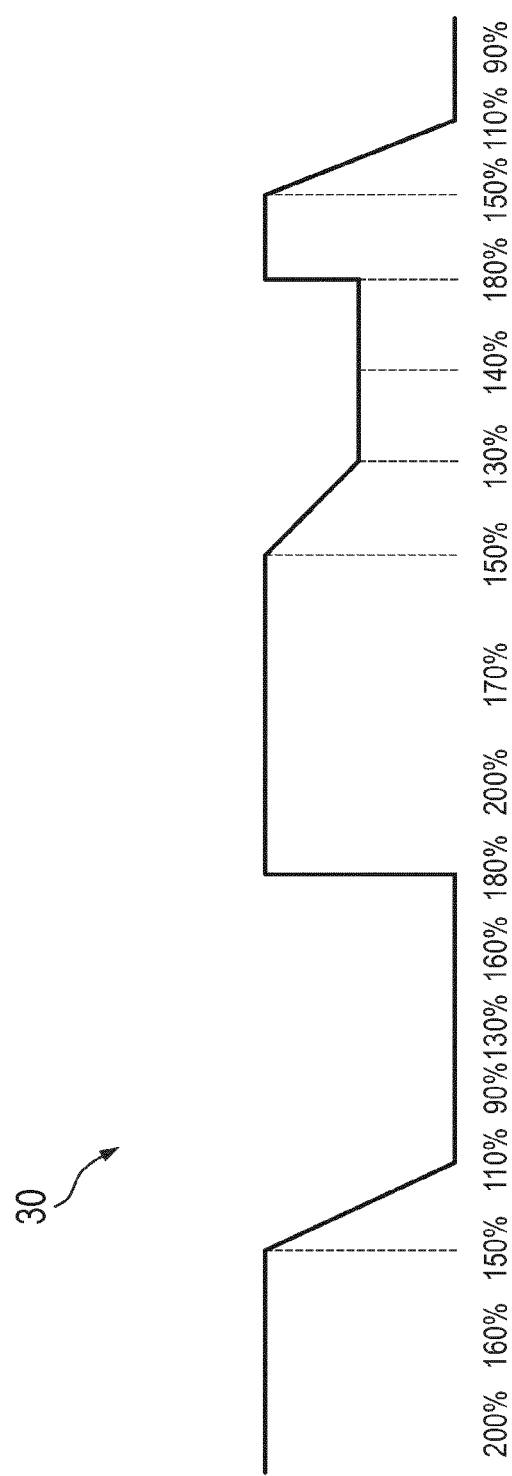

METHOD FOR OPTIMIZING THE POWER OF AN ELECTRIFIED VEHICLE, AND VEHICLE

This nonprovisional application is a National Stage of International Application No. PCT/EP2021/053881, which was filed on Feb. 17, 2021, and which claims priority to German Patent Application No. 10 2020 203 692.0, which was filed in Germany on Mar. 23, 2020, and which are both herein incorporated by reference.

BACKGROUND OF THE INVENTION

Field of the Invention

The invention relates to a method for optimizing the power of an electrified vehicle, which includes at least one electrical energy accumulator, at least one electrical drive, and at least one auxiliary unit, the electrical energy accumulator having a maximum discharge power and a continuous discharge power.

In addition, the invention relates to a vehicle, which includes at least one electrical energy accumulator, at least one electrical drive, at least one auxiliary unit, and at least one power control unit, the electrical energy accumulator having a maximum discharge power and a continuous discharge power.

Description of the Background Art

The dominance of the internal combustion engines in passenger cars, which has existed for many years, is to be replaced by sustainable electrical drives. The electrical engines in the present purely electrical vehicles generally draw their energy from accumulators in the form or one or multiple batteries. The advantage of electric cars is primarily that they do not produce any local $CO_2$ emissions. One disadvantage of present electric cars is their short range, compared to vehicles including internal combustions engines. The general difference between the energy accumulators also involves disadvantages. The power of an internal combustion engine is not dependent on the tank fill level. The performance of an electric motor, however, depends on the fluctuating performance of the electrical energy accumulator. This is due not least to the dependency of high-voltage batteries on temperature. A significant power limitation is to be expected at a low cell temperature.

Different approaches have been taken to calculate the range of an electric vehicle depending on the temperature and the associated fluctuating performance of a high-voltage battery.

JP 2013 068590 A, for example, shows a method for ascertaining the range of an electric vehicle, taking into account the weather information. The pieces of weather information which cover a planned travel route are recorded, the state of charge of a high-voltage battery is detected, and the average power consumption in a stipulated section is ascertained. Based on the pieces of weather information, the required power of a driver-assisted auxiliary engine is determined, and the range of the vehicle is ascertained therefrom. The present range may also be determined during the travel, based on up-to-date, transmitted pieces of weather information.

Although the aforementioned prior art takes into account the cell temperature of a high-voltage battery, further influences for optimizing power, in particular the instantaneous power availability, are not considered.

SUMMARY OF THE INVENTION

The object of the invention is now to provide a method for optimizing power as well as a vehicle, in which a preferably long and acceptable vehicle operation and a greatest possible availability of comfort functions are possible.

In the present invention, this object is achieved by the features of the characterizing portion of Patent claim 1, according to which the maximum discharge power is made available to the electrical drive and/or the at least one auxiliary unit in a certain energy contingent. After the energy contingent is used up, the maximum discharge power is reduced to the continuous discharge power, and the power of the at least one auxiliary unit is reduced depending on the still available energy contingent of the maximum discharge power, if a certain limit value is exceeded by the power demand for the electrical drive and the power of the at least one auxiliary unit. The method may be used in all vehicles including electrified drives, in particular in electric battery-operated vehicles, plug-in hybrid vehicles, and fuel cell vehicles. In other words, an energy contingent is available which may be requested with full power. Once the contingent has been used up, a reduction to the continuous discharge power takes place. The secondary consumers should not be controlled solely via the available continuous discharge power, but should also be able to access the energy contingent. However, the secondary consumers should not have the entire energy contingent, which is why a reduction of the available power for secondary consumers takes place in that expected "normal" driving maneuvers may not be managed without restriction.

The energy contingent may be, for example, a time contingent for the power demand of the electrical energy accumulator. It may generally be a contingent which influences the availability of the discharge power above the continuous discharge power. This also includes, for example, a usable energy quantity, a time duration, a power throughput, or a thermal energy input.

All auxiliary engines of a vehicle which do not directly effectuate the locomotion of the vehicle are understood to be auxiliary units. These include, for example, steering and brake support as well as air conditioning and heating.

The maximum discharge power is understood to be the power available without taking into account an instantaneous load or a load history. To ensure the lifespan of the electrical energy accumulator, the maximum discharge power is made available without limitation for only approximately 10 seconds or some 10s of seconds, after which a deliberate drop of the present discharge power to the continuous discharge power takes place. The continuous discharge power may be referred to as a lower power level than the maximum discharge power. The continuous discharge power is available for a longer period of time. The instantaneous discharge power is dependent on the instantaneous operating state. Correspondingly, the maximum discharge power is also dependent on the instantaneous operating state.

The power demand for the electrical drive takes place on the part of the driver of the vehicle by actuating the pedal, but it also takes place by driver assistance systems. The electrical energy accumulator may be, in particular, a high-voltage battery.

A first advantage of the method according to the invention is that a compromise may be reached between the power of auxiliary units and the electrical drive in certain situations. It is possible to distribute the power between auxiliary units and the electrical drive in such a way that a preferably long and acceptable vehicle operation is made possible, despite a possibly greatly limited power availability on the part of the electrical energy accumulator. The available power is therefore intelligently distributed.

Comfort systems, in particular, may be interpreted as a kind of base load. A base load is usually not supplied from a source which is available for a short time. This means that the supply of the comfort system takes place via sources available for a longer period of time, i.e., due to the continuous discharge power. In order for the auxiliary units, in particular comfort systems, to be usable even in the case of a stationary vehicle or low driving power, the energy contingent is also made available to the auxiliary units.

By monitoring the still available energy contingent, auxiliary units, in particular comfort systems, may be kept active if the drive has a correspondingly low energy demand. In the correspondingly other case, this power may be reduced or shut down entirely if correspondingly high driving power is requested.

Other preferred embodiments of the invention are derived from the other features mentioned in the subclaims.

In a first preferred embodiment of the invention, it is provided that the limit value is defined by the continuous discharge power of the electrical energy accumulator. In this way, the minimum limit for the power is defined, which is just sufficient to supply the drive with power and to simultaneously make a maximum power available for the at least one auxiliary unit in the present operating point.

Alternatively, in a further embodiment of the invention, it may be provided that a certain ratio between the instantaneous discharge power of the electrical energy accumulator and the maximum discharge power of the electrical energy accumulator is selected as the limit value, preferably a ratio between 40% and 80%, particularly preferably between 50% and 70%. As a limit value, this ratio may also be variably adapted while driving the electrified vehicle. The limit value may thus be adapted to the individual circumstances while driving the vehicle. It would also be conceivable that route data or pieces of information about an imminent downhill travel is included to adapt the enabling of the energy contingent for auxiliary units.

To take into account further influences on the power, in a further embodiment of the invention, it is provided that the power of the at least one auxiliary unit is reduced depending on the temperature of the electrical energy accumulator. The power of the at least one auxiliary unit is thus additionally reduced depending on the temperature of the electrical energy accumulator. This may be implemented, for example, in that the maximum discharge power is defined depending on the instantaneous temperature of the electrical energy accumulator. In addition, the maximum discharge power may also be dependent on the present load history.

Accordingly, in a further embodiment of the invention, it may alternatively or additionally be provided that the power of the at least one auxiliary unit is reduced depending on the state of charge of the electrical energy accumulator. The power of the at least one auxiliary unit is thus additionally reduced depending on the state of charge of the electrical energy accumulator. This may be implemented, for example, in that the maximum discharge power is defined depending on the instantaneous state of charge of the electrical energy accumulator. In addition, the maximum discharge power may also be dependent on the present load history. The maximum discharge power may also be defined depending on the instantaneous temperature of the electrical energy accumulator, of the instantaneous state of charge of the electrical energy accumulator, and of the present load history.

In a further preferred embodiment of the invention, at least two auxiliary units are provided. The auxiliary units are assigned priorities, and the power of the auxiliary units is reduced depending on the assigned priority. In this way, the power of auxiliary units having the least influence on an acceptable operation and, in particular, on the driver's request, is reduced first. It may be provided that the priorities are adapted during operation. It is conceivable that the priorities are changed by settings made by the driver of the vehicle.

If the driver, for example, changes the air conditioning of the vehicle, this may be evaluated as an indication that the driver prefers, in particular, the air conditioning in the current situation. Accordingly, the priority of the auxiliary units responsible for the air conditioning may be increased. Other auxiliary units which may not be assigned to the supposed driver request, and which are not immediately necessary for an acceptable operation of the electrified vehicle, are assigned a correspondingly lower priority. Within the meaning of the method according to the invention, the power of these auxiliary units is reduced first.

In a further embodiment of the invention, it is alternatively or additionally provided that at least one comfort system is supplied with power by an auxiliary unit, and a low priority is assigned to this auxiliary unit. A comfort system is understood to be, for example, the air conditioning system of the electrified vehicle. In the normal setting, it may therefore be provided that the power of comfort systems or of auxiliary units which supply power to the comfort systems is generally reduced first, since the latter do not directly effectuate the locomotion of the vehicle. The priority may be changed by the driver's request.

To further optimize the method, in a further preferred embodiment of the invention, it is provided that upon dropping below a second limit value for the first time, after exceeding the limit value, the power of the at least one auxiliary unit is again increased. It is consequently recognized that a recovery of the system takes place. Subsequently, the contingent is again fulfilled for the demand of the instantaneously maximum discharge power. A power enable for the power of the auxiliary units that was previously reduced takes place accordingly. In this way, it remains ensured that auxiliary unit functions are not left out entirely even with greater power limitations of the electrical energy accumulator. The auxiliary units receive power if the driver of the electrified vehicle does not request it to a greater degree for the drive.

To also take into account influences of the surroundings, in a further preferred embodiment of the invention, it is provided that the electrical energy accumulator is heated if the temperature of the electrical energy accumulator drops below a temperature limit value. In the case that the electrical energy accumulator is a high-voltage battery, the power of the electrical energy accumulator is greatly dependent on the cell temperature. This means that in cold weather, for example, it may be necessary to increase the temperature of the electrical energy accumulator in order to optimize the power. The auxiliary unit responsible for heating the electrical energy accumulator may be automatically prioritized in cold weather, so that the power of this auxiliary unit is not reduced first when carrying out the method according to the invention.

In a further advantageous embodiment of the invention, it is provided that the instantaneous discharge power of the electrical energy accumulator is signaled to a driver of the electrified vehicle. The signaling may also take place acoustically as well as visually. A visual signaling is possible, for example, in the display region of a display device. In this way, the driver may also actively influence the instantaneous discharge power. If he does not place too excessive a demand on the electric drive, the instantaneous discharge power also decreases. Moreover, it is also conceivable as a matter of course that the available time contingent of the maximum discharge power is signaled to the driver of the vehicle. This may also take place acoustically as well as preferably visually.

One possibility for representing the availability of the unlimited maximum discharge power is the so-called load-dependent performance indicator for the discharge. It reflects the information about the availability of an unlimited maximum discharge power and the degree of a load-related limitation. In the case of a continuously low load below the continuous discharge power, the performance indicator takes on the value 200%. If the instantaneous discharge power of the electric energy accumulator is above the continuous discharge power, the value decreases in proportion to the level of the excess. At 100%, the time contingent for the maximum discharge power is used up, and the active withdrawal of the maximum discharge power begins. The maximum discharge power which is then still available is scaled with the unlimited maximum discharge power directly via the value of the performance indicator. If the load below the continuous discharge power is withdrawn, the performance indicator increases again.

The aforementioned object is also achieved by an aforementioned vehicle, in that the power control unit makes the maximum discharge power available to the electrical drive and/or the at least one auxiliary unit in a certain time contingent, the power control unit reduces the maximum discharge power to the continuous discharge power after the time contingent has been used up, and the power control unit reduces the power of the at least one auxiliary unit depending on the still available time contingent of the maximum discharge power if the power demand for the electrical drive and the power of the at least one auxiliary unit exceed a certain limit value. A vehicle of this type may be, in particular, an electric battery-operated vehicle, a plug-in hybrid vehicle, or a fuel cell vehicle, or a mixture of these vehicle types.

In a first exemplary embodiment of the vehicle according to the invention, it is provided that the electrical energy accumulator is a high-voltage battery. The high-voltage battery may be designed, for example, as a metal hydride battery or also as a lithium-ion battery. The high-voltage battery is divided into individual modules. Individual cells having a voltage of one to two volts are then connected in series in the modules. In total, this results in the necessary high voltage.

In a further preferred embodiment of the vehicle according to the invention, heating elements are provided for the electrical energy accumulator. For example, since the performance of a high-voltage battery is greatly dependent on the temperature of the high-voltage battery or on the cell temperature, the heating elements are used to optimize the power.

To improve the operability of the vehicle according to the invention, in a further embodiment, at least one display device is provided, which has at least one display region for representing the instantaneous discharge power of the electrical energy accumulator. The display region of the display device may be a display in the middle region or in the cockpit region, for example, in the instrument cluster of the vehicle. Alternatively or additionally, the display region of the display device may be designed as a head-up display. A head-up display is understood to be a display region, in which the driver may maintain his head position or line of vision, because the information in his field of vision is projected, for example, onto the windshield of the vehicle.

The representation of the instantaneous discharge power may be displayed directly. It is also conceivable that the instantaneous discharge power is displayed graphically depending on the maximum discharge power and/or the continuous discharge power. The maximum discharge power and the continuous discharge power may be represented in a diagram as boundaries or markings. This gives the driver a piece of information on how far he is from the particular markings, among other things due to his mode of driving. This representation may cause the driver to adapt his mode of driving accordingly in order to facilitate a power optimization of the electrical energy accumulator.

The representation of the discharge power may also be implemented by representing the aforementioned load-dependent performance indicator.

In a particularly preferred embodiment of the vehicle according to the invention, it is provided that the power control unit carries out a method according to one of claims 2 through 10. All preceding remarks regarding the method according to the invention also correspondingly apply to the vehicle according to the invention.

The different specific embodiments of the invention mentioned in this application may be advantageously combined with each other unless otherwise indicated in the individual case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 3 show an example of a profile of a performance indicator.

DETAILED DESCRIPTION

Figure 1:
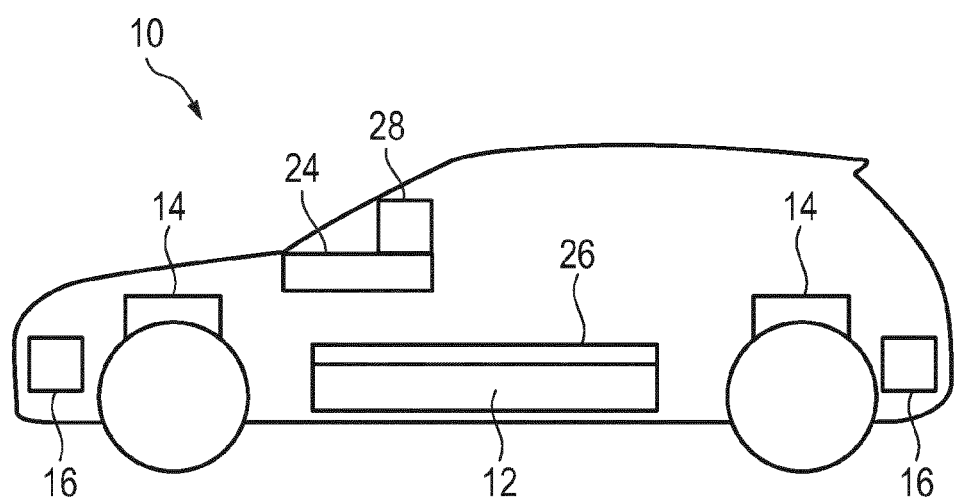
FIG. 1 shows a schematic representation of one exemplary embodiment of a vehicle according to the invention.

FIG. 1 shows an electrified vehicle 10, which includes an electrical energy accumulator 12 in the form of a high-voltage battery. Vehicle 10 includes two electrical drives 14, which are used for the locomotion of vehicle 10. Two auxiliary units 16 are also provided, which are understood to be auxiliary engines of vehicle 10. These auxiliary units 16 do not directly effectuate the locomotion of the vehicle, but rather supply power, for example to the electrical generator, which is not illustrated here. A maximum discharge power 18, a continuous discharge power 20, and an instantaneous discharge power 22 are assigned to electrical energy accumulator 12 (cf. FIG. 2). Electrical drive 14 and auxiliary units 16 are supplied with energy during the discharge of electrical energy accumulator 12.

A power control unit 24 is provided to optimize the power of electrified vehicle 10. If the performance of electrical energy accumulator 12 in vehicle 10 is no longer sufficient to adequately supply all auxiliary units 16 and fulfill the driver's request, i.e., the power for electric drive 14 requested by actuating the pedal for acceleration, a way must be found to intelligently distribute the available power to facilitate an acceptable vehicle operation for the driver.

In cold weather, in particular, if the power of the electrical energy accumulator is limited, due to the cold, a corresponding power management function which is carried out by power control unit 24 is advantageous.

For this purpose, it is provided that power control unit 24 performs a reduction and re-enabling of the power of auxiliary units 16 depending on instantaneous discharge power 22 of electrical energy accumulator 12. Vehicle control unit 24 ascertains how high instantaneous discharge power 22 is in relation to maximum discharge power 18 in the instantaneous operating state of electrical energy accumulator 12 according to the battery characteristic map of electrical energy accumulator 12 designed as a high-voltage battery. Maximum discharge power 18 in the instantaneous operating point of electrical energy accumulator 12 is available only in a certain time contingent. After the time contingent has been used up, maximum discharge power 18 is reduced to continuous discharge power 20. In the case of a high power demand above continuous discharge power 20, this takes place faster; with a moderate power demand above continuous discharge power 20, this takes place more slowly.

Due to a low cell temperature of electrical energy accumulator 12, and/or due to a low state of charge, continuous discharge power 20 may provide too little power for electrical drive 14 after deducting the power of auxiliary units 16 in order to adequately fulfill the driver's request. In the extreme case, continuous discharge power 20 is not sufficient to supply electric drive 14 and all auxiliary units 16 at the same time. To fulfill the driver's request as effectively as possible, power control unit 24 reduces the power for auxiliary units 16 depending on the still available contingent of maximum discharge power 18.

Before maximum discharge power 18 drops to continuous discharge power 20, a portion of the power of auxiliary units 16 has already been left out, and the power is available to electrical drive 14. In this way, a large portion of continuous discharge power 20 is always available for the drive. If a system recovering is detected by power control unit 24, the contingent for the demand of instantaneously maximum discharge power 18 is again increased. During the course thereof, a power enable takes place for auxiliary units 16 whose power was previously reduced. In this way, it remains ensured that the function of auxiliary units 16 does not cease entirely even in the case of greater power limitations of electrical energy accumulator 12. Auxiliary units 16 receive power if the driver does not request a lot of it for electrical drive 14.

The method carried out by power control unit 24 takes into account not only the general power limitation of electrical energy accumulator 12, for example due to a low cell temperature or a low state of charge, but explicitly also takes into account instantaneous discharge power 22, which results to a great extend from the driving actions performed by the driver. The method thus takes into account the instantaneous power demand by the driver in situations, in which vehicle 10 would have limited drivability, solely due to taking into account the limited system state of electric energy accumulator 12. The special feature is thus the redistribution of power between auxiliary units 16 and electrical drive 14. The crucial advantage consequently lies in a compromise, in which power is divided between auxiliary units 16 and electrical drive 14 in such a way that a preferably long and acceptable vehicle operation is possible, while simultaneously retaining some comfort systems, which are not illustrated here, despite the greatly limited power availability on the part of electrical energy accumulator 12.

Since maximum discharge power 18 of electrical energy accumulator 12 is highly temperature-dependent, and great losses in maximum discharge power 18 of electrical energy accumulator 12 are to be feared, particularly in cold weather, a heating element 26 for heating electrical energy accumulator 12 is provided to counteract a power drop. Heating element 26 is arranged in the immediate vicinity of electrical energy accumulator 12.

Figure 2:
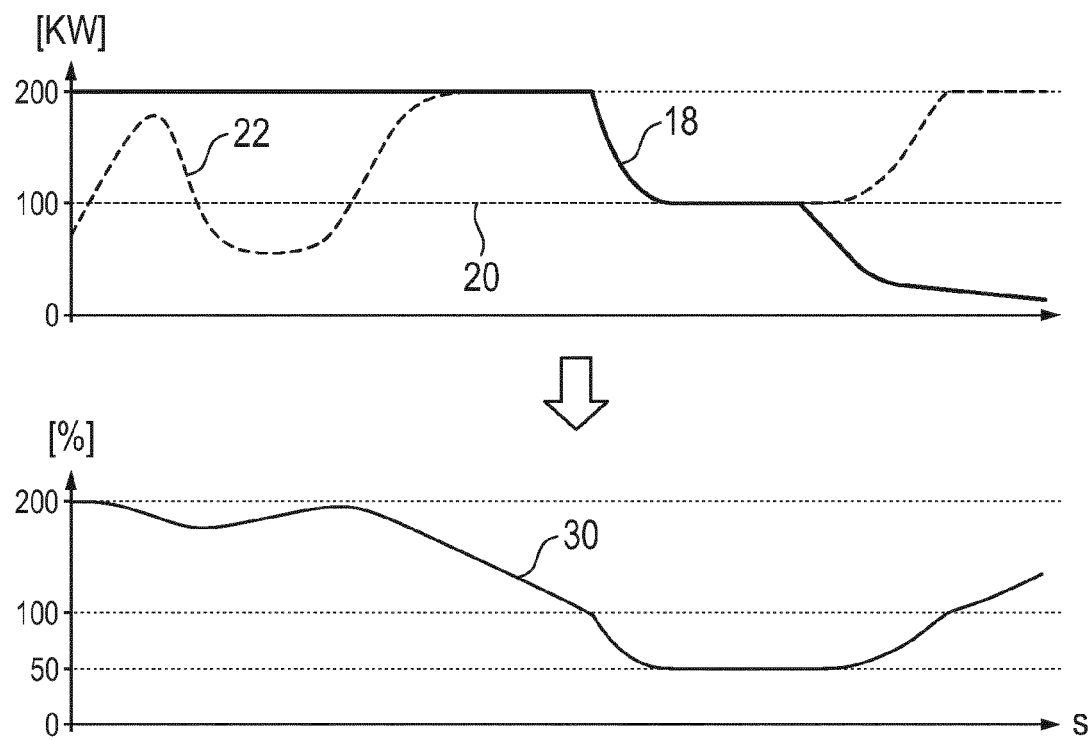
FIG. 2 schematically shows the relationship of individual parameters of a method according to the invention.

FIG. 2 graphically illustrates the method carried out by power control unit 24. The graphical representation may also be represented in a display region of a display device 28. A graphical representation, for example of instantaneous discharge power 22 or a profile of maximum discharge power 18, may provide the driver of vehicle 10 with pieces of information about the state of electrical energy accumulator 12. Due to the illustrated pieces of information, the driver may himself actively contribute to a power optimization, in that he adapts his mode of driving to the individual circumstances and, for example, does not request an excessive about of power from electrical drive 14 when maximum discharge power 18 approaches continuous discharge power 20.

An example of a profile of the power availability of electrical energy accumulator 12 is illustrated in FIG. 2. In the beginning, instantaneous discharge power 22 is briefly increased and subsequently drops back below continuous discharge power 20. This is followed by a phase, in which the maximum discharge power is requested, due to the interplay between the weather and the mode of driving of the driver of vehicle 10. Maximum discharge power 18 continuous to be requested until the time contingent for the use is consumed, and maximum discharge power 18 is reduced to continuous discharge power 20. This is apparent in the drop in maximum discharge power 18. To ensure the lifespan of electrical energy accumulator 12, maximum discharge power 18 is made available without limitation only for a maximum of 10 to 20 seconds, after which a reduction to continuous discharge power 20 takes place. The dashed line indicates maximum discharge power 18 if the time contingent for requesting maximum discharge power 18 were not used up.

Instantaneous discharge power 22 subsequently drops below continuous discharge power 20. The system recovers, and maximum discharge power 18 is again increased to its original value. The time contingent for using maximum discharge power 18 is also restored. So-called performance indicator 30, which is exampled in greater detail in FIG. 3, is illustrated in the lower diagram.

FIG. 3 shows the possibility for illustrating the method based on performance indicator 30. This type of representation is also possible on display device 28. Performance indicator 30 is indicated in percentage and supplies information about the availability and load-related limitation of maximum discharge power 18. In the case of a continuously low load below continuous discharge power 20, performance indicator 30 takes on the value 200%. If instantaneous discharge power 22 of electrical energy accumulator 12 is above continuous discharge power 20, the value continuously decreases in proportion to the amount of the excess. At 100%, the time contingent of maximum discharge power 18 is used up, and the active withdrawal of maximum discharge power 18 begins. Still available maximum discharge power 18 is scaled directly with unlimited maximum discharge power 18 via the value of performance indicator 30. If the load below continuous discharge power 20 is withdrawn, performance indicator 30 increases again.

If performance indicator 30 drops below an applicable threshold of 150%, the power of auxiliary units 16 is reduced from a higher power level to a lower one in proportion to performance indicator 30, down to a lower applicable threshold of 110% of performance indicator 30. If the power was only partially reduced, i.e., if performance indicator 30 has not dropped to 110%, power is again enabled only if performance indicator 30 exceeds a third applicable threshold of 180%. The higher power level is then enabled again on an ad-hoc basis. The applicable thresholds may also be adapted according to the requirements.

IN the range between 200% and 100%, maximum discharge power 18 of electrical energy accumulator 12 is available for a period of 30 seconds, or a lower power above the continuous discharge power is available for a correspondingly longer time. In the range between 100% and 0%, the available power is reduced from maximum discharge power 18 to continuous discharge power 20. A recovery takes place if power values of less than continuous discharge power 20 are requested.

In the exemplary embodiment described here, exactly two functions are reduced in power during the transition from the higher power level to the lower one. These are heating element 26 for heating electrical energy accumulator 12 and a base air conditioning system, which is not illustrated. If the lower power level is therefore reached, no power is available anymore to these two consumers. If the high power level is present, the two functions receive the power they request.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A method for optimizing power of an electrified vehicle, which comprises at least one electrical energy accumulator, at least one electrical drive, and at least one auxiliary unit, the electrical energy accumulator having a maximum discharge power and a continuous discharge power, the method comprising:
    making the maximum discharge power available to the electrical drive and/or the at least one auxiliary unit in a certain energy contingent;
    reducing the maximum discharge power to the continuous discharge power after the certain energy contingent is used up; and
    reducing a power of the at least one auxiliary unit depending on the certain energy contingent of the maximum discharge power that is still available when a limit value is exceeded by a power demand for the electrical drive and the power of the at least one auxiliary unit, the energy contingent that is still available being non-zero,
    wherein the limit value is defined by the continuous discharge power of the electrical energy accumulator.

2. The method according to claim 1, wherein the power of the at least one auxiliary unit is reduced depending on a temperature of the electrical energy accumulator.

3. The method according claim 1, wherein the power of the at least one auxiliary unit is reduced depending on a state of charge of the electrical energy accumulator.

4. The method according to claim 1, wherein at least two auxiliary units are provided, priorities are assigned to the auxiliary units, and a power of the auxiliary units is reduced depending on the assigned priority.

5. The method according to claim 4, wherein at least one comfort system is supplied with power by one of the auxiliary units, and a low priority is assigned thereto.

6. The method according to claim 1, wherein, upon dropping below a second limit value for a first time, after exceeding the limit value, the power of the at least one auxiliary unit is increased again.

7. The method according to claim 1, wherein the electrical energy accumulator is heated when a temperature of the electrical energy accumulator drops below a temperature limit value.

8. The method according to claim 1, wherein an instantaneous discharge power of the electrical energy accumulator is signaled to a driver of the electrified vehicle.

9. A vehicle, comprising:
    at least one electrical energy accumulator having a maximum discharge power and a continuous discharge power;
    at least one electrical drive;
    at least one auxiliary unit; and
    at least one power control unit,
    wherein the power control unit makes the maximum discharge power available to the electrical drive and/or the at least one auxiliary unit in a certain energy contingent, the power control unit reduces the maximum discharge power to the continuous discharge power after the certain energy contingent is used up, and the power control unit reduces a power of the at least one auxiliary unit depending on the certain energy contingent of the maximum discharge power that is still available when a power demand for the electrical drive and the power of the at least one auxiliary unit exceed a limit value, the energy contingent that is still available being non-zero, and
    wherein the limit value is defined by the continuous discharge power of the electrical energy accumulator.

10. The vehicle according to claim 9, wherein the electrical energy accumulator is a high-voltage battery.

11. The vehicle according to claim 9, wherein at least one heating element is provided for the electrical energy accumulator.

12. The vehicle according to claim 9, wherein at least one display device is provided, which has at least one display region for displaying an instantaneous discharge power of the electrical energy accumulator.

* * * * *